United States Patent
Bania et al.

(10) Patent No.: US 10,134,046 B2
(45) Date of Patent: Nov. 20, 2018

(54) SOCIAL SHARING AND INFLUENCE GRAPH SYSTEM AND METHOD

(75) Inventors: Ashok Pratim Bania, Bangalore Karnataka (IN); Aman Teja, Bangalore Karnataka (IN); Soma Biswas, Bangalore Karnataka (IN); Praveen Kanyadi, Bangalore Karnataka (IN)

(73) Assignee: EXCALIBUR IP, LLC, New York, NY (US)

( * ) Notice: Subject to any disclaimer, the term of this patent is extended or adjusted under 35 U.S.C. 154(b) by 478 days.

(21) Appl. No.: 13/292,958

(22) Filed: Nov. 9, 2011

(65) Prior Publication Data

US 2013/0117364 A1 May 9, 2013

(51) Int. Cl.
*G06Q 30/02* (2012.01)
*G06Q 50/00* (2012.01)

(52) U.S. Cl.
CPC .............. *G06Q 30/02* (2013.01); *G06Q 50/01* (2013.01)

(58) Field of Classification Search
CPC ......... H04L 51/04; G06Q 30/02; G06Q 50/01
USPC ....................................................... 709/204
See application file for complete search history.

(56) References Cited

U.S. PATENT DOCUMENTS

| | | | |
|---|---|---|---|
| 2008/0133678 A1 | 6/2008 | Woodham et al. | |
| 2008/0209340 A1* | 8/2008 | Tonse et al. | 715/745 |
| 2009/0144392 A1* | 6/2009 | Wang et al. | 709/217 |
| 2009/0164897 A1* | 6/2009 | Amer-Yahia et al. | 715/703 |
| 2010/0332426 A1* | 12/2010 | Van Bemmel | 706/12 |
| 2011/0066725 A1 | 3/2011 | Kim | |
| 2011/0179385 A1* | 7/2011 | Li et al. | 715/810 |
| 2012/0117151 A1* | 5/2012 | Bill | 709/204 |
| 2012/0151383 A1* | 6/2012 | Kazan et al. | 715/753 |
| 2013/0018838 A1* | 1/2013 | Parnaby et al. | 706/52 |

OTHER PUBLICATIONS

Tan et al. "User-Level Sentiment Analysis Incorporating Socal Networks." Aug. 21-24, 2011.*

* cited by examiner

*Primary Examiner* — June Y Sison
*Assistant Examiner* — Steven C Nguyen
(74) *Attorney, Agent, or Firm* — James J. DeCarlo; Greenberg Traurig, LLP

(57) ABSTRACT

Sharing of content by users via the network is facilitated. Sharing suggestions are made to a user, the sharing suggestions including making a suggestion of one or more users with whom the user might wish to share content. A user's influence on other users and the user can be prompted to share content with other users based on the identified influence.

21 Claims, 7 Drawing Sheets

1

SOCIAL SHARING AND INFLUENCE GRAPH SYSTEM AND METHOD

FIELD OF THE DISCLOSURE

The present disclosure relates to sharing of content by users via the network, and more particularly to making sharing suggestions to a user, the sharing suggestions including making a suggestion of one or more users with whom the user might wish to share content. Additionally, the present disclosure relates to identifying an influence of a user on other users, and prompting the user to share content based on the user's identified influence.

BACKGROUND

A person typically enjoys sharing something that the person finds interesting. On the internet, or other network, a user can share a web page by mailing a copy of the web page, or a link to the web page, to another user or users. Social network systems, such as Facebook™, Twitter™ allow the user to share content; however such systems require the user to identify those users to whom the user wishes to share content.

SUMMARY

The present disclosure seeks to address failings in the art and to provide a system and method of social sharing, and more particularly to identifying for the user those users that have a propensity to react to the content, e.g., the propensity to click on the content that the user wishes to share. In accordance with one or more embodiments, the user wishing to share content identifies a sentiment for the content, which is used to identify one or more users likely to share the same sentiment for the content, and all or some of the identified users are provided for the sharing user to select from to share the content. In accordance with one or more embodiments, one or more users whose content is accessed, e.g., clicked on or otherwise selected, the most are identified as the top influencers, and are encouraged or incentivized to share. In accordance with one or more embodiments, influencers can be identified by sentiment, e.g., identified based on the sentiment that content elicits. In addition to sentiment, influencers can be identified based on the sharing relationship between the sending user, or sender, and the receiving user(s) with whom the content is shared.

A method is provided, in accordance with one or more embodiments, the method comprising receiving, via at least one computing device, a user's request to share content, the request identifying a sentiment of the user about the content; identifying, via the at least one computing device and using the sentiment, a list of potential receivers of the content; serving, via the at least one computing device, the list of potential receivers in response to the request; receiving, via the at least one computing device, input indicating the user's selection of at least one receiver from the list of potential receivers; and making, via the at least one computing, the content available to the at least one receiver.

In accordance with one or more embodiments a system is provided comprising at least one computing device comprising one or more processors to execute and memory to store instructions to receive a user's request to share content, the request identifying a sentiment of the user about the content; identify, using the sentiment, a list of potential receivers of the content; serve the list of potential receivers in response to the request; receive input indicating the user's selection of at least one receiver from the list of potential receivers; and make the content available to the at least one receiver.

In accordance with one or more embodiments, computer readable non-transitory storage medium for tangibly storing thereon computer readable instructions is provided, the computer readable instructions when executed cause at least one processor to receive a user's request to share content, the request identifying a sentiment of the user about the content; identify, using the sentiment, a list of potential receivers of the content; serve the list of potential receivers in response to the request; receive input indicating the user's selection of at least one receiver from the list of potential receivers; and make the content available to the at least one receiver.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1, which comprises FIGS. 1A and 1B, provides process flow examples in accordance with one or more embodiments of the present disclosure.

FIG. 2 provides an example of sharing data being collected in a data collection step or phase in accordance with one or more embodiments of the present disclosure.

FIG. 3, which comprises FIGS. 3A-3C, provides user interface examples in accordance with one or more embodiments of the present disclosure.

FIG. 4 provides a system overview illustrating components for use in accordance with one or more embodiments of the present disclosure.

DETAILED DESCRIPTION

Figure 1A:
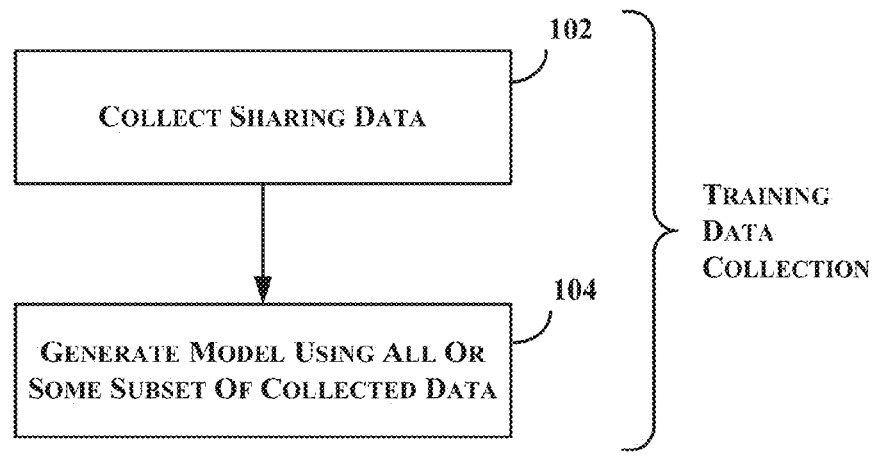

In general, the present disclosure includes a social sharing and influence graph system, method and architecture.

Certain embodiments of the present disclosure will now be discussed with reference to the aforementioned figures, wherein like reference numerals refer to like components.

In accordance with one or more embodiments, in response to a sharing request by a user, one or more receiving users are identified that have a propensity to react to the content, e.g., the propensity to click on the content, re-share the content, etc. In accordance with one or more embodiments, the user wishing to share content identifies a sentiment, which might be an indicator of the reason the user wishes to share the content, and where there is a model, or graph, for the user and the identified sentiment, one or more potential receivers, or users likely to react to the content, are identified. The one or more potential receivers are provided to the sender, and the sender is able to select one or more of the potential receivers with which to share the content. The potential receivers can be any users from the pool of users, and may include users known to the sender, e.g., friends, and/or users that are not known to the sender.

The model, or graph, that is used to identify potential receivers for a user is generated using training data that is collected from data recorded from previous content shares by the sender. FIG. 1A provides an example of a model training process flow for use in accordance with one or more embodiments. At step 102, sharing data is collected. By way of some non-limiting examples, content that may be shared can include content presented in connection with a web page, such as an article, image, multimedia, audio content, video content, textual content, etc. presented to a user, e.g., via a web page of a browser application on the user's computer. A user may elect to share content via Facebook™, retweet via Twitter™, an application such as a messaging application, e.g., an electronic mail application, instant messaging application, etc.

Figure 3A:
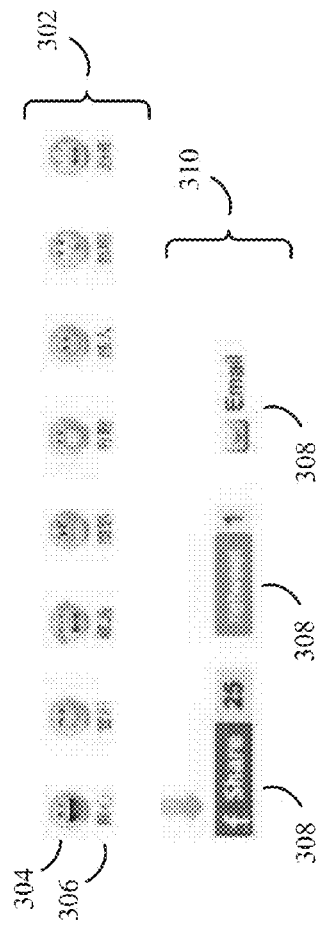

FIG. 3A provides an example of a sharing user interface for use in collecting sharing data in accordance with one or more embodiments of the present application. Initially, the user is presented with one or more sentiment indicators 302. Each of the sentiment indicators represents a sentiment, or reaction, of the user toward or about the content, such as without limitation the user feels that the content is funny, disgusting, provocative, helpful, informative, etc. In the example shown in FIG. 3A, each sentiment indicator 302 comprises an icon 304 and corresponding text 306, and corresponds to a sentiment. It should be apparent that any mechanism can be used to represent a sentiment. Any method of selection is possible, including without limitation clicking on or hovering over icon 304 and/or text 306 with a pointing device, such as a mouse.

In the data collection step 102 of FIG. 1A, the user selects a sentiment, e.g., by selecting icon 304 and/or text 306 of FIG. 3A, corresponding to the sentiment the user wishes to use. In response, the user is presented with one or more sharing options 310, which the user can select to share the content. In the data collection step, or phase, 102 the user identifies the users with whom the user wishes to share the content, e.g., using one or more social networking systems or applications, e.g., Facebook™, Twitter™, and or other sharing application, such as a electronic messaging, instant messaging, etc. application. The sender can select more than one sharing option to share the content using the same sentiment. The sender can select another sentiment and share the content using a different sentiment using one or more sharing options.

Figure 2:
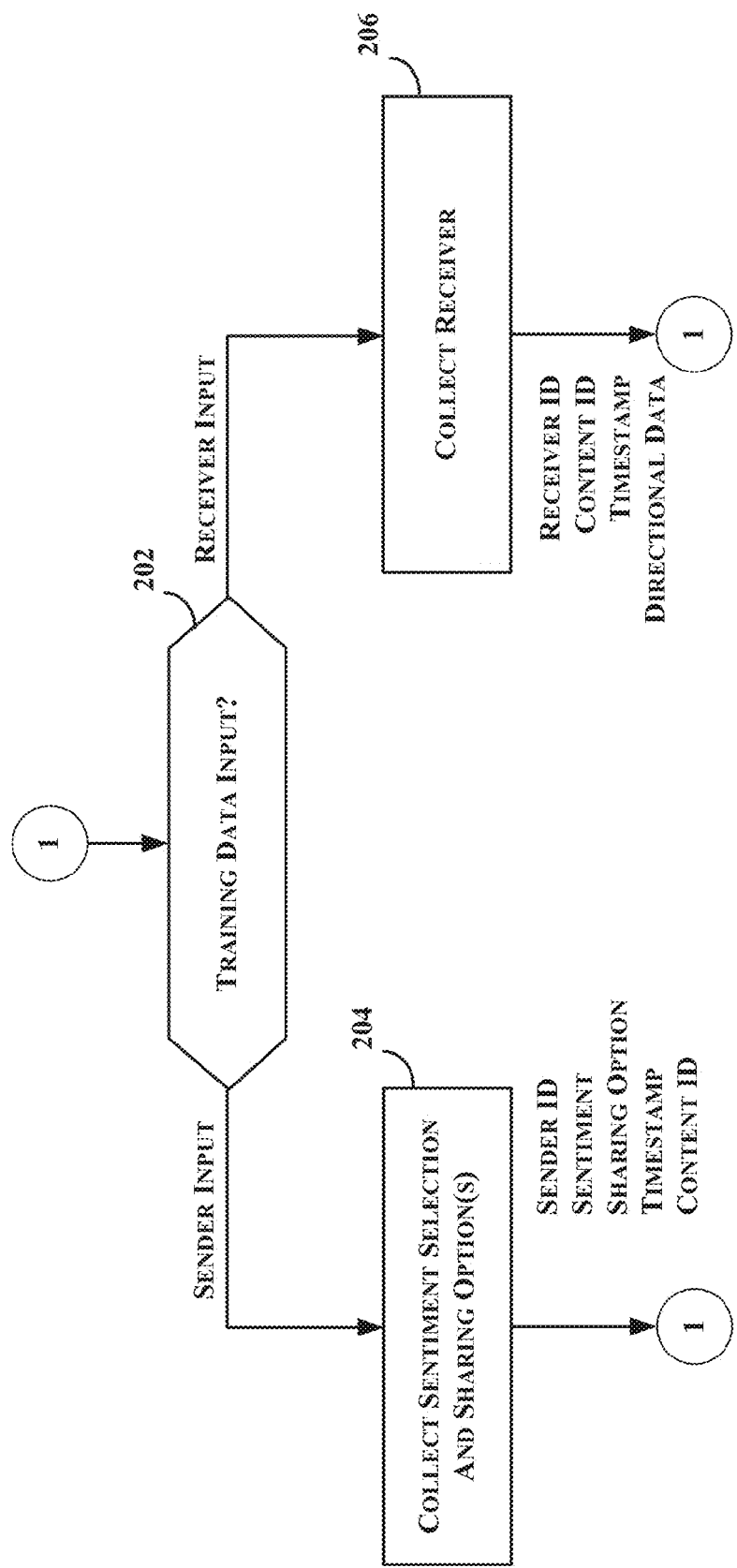

FIG. 2 provides an example of sharing data being collected in a data collection step or phase in accordance with one or more embodiments of the present disclosure. In accordance with one or more embodiments, data can be collected in connection with the sender sending content, and data can be collected in connection with a receiver of content, a user that receives the content shared by the sending user. Where the receiver elects to share the content shared by the sender, the receiver becomes a sender. At step 202 of FIG. 2, where the training data that is being collected is being collected in connection with a sender, processing continues at step 204 to collect sharing data for the sender, such as the user identifier (ID) that uniquely identifies the sender, the sentiment selected by the sender to share the content, the sharing option selected by the sender, a timestamp of the content sharing, e.g., a sending timestamp, and an identifier that uniquely identifies the content, e.g., a content ID. By way of a non-limiting example, the content ID can be a universal resource locator (URL) that identifies the content. At step 202 of the data collection phase, where the training data that is being collected is collected in connection with a receiver, processing continues at step 206 to collect sharing data for the receiver, such as the unique user ID that identifies the receiver, the content ID of the content received by the receiver, a timestamp identifying a time that the receiver reacted, e.g., clicked on or otherwise opened or selected, the content shared by the sender, and directional data, which indicates that the content identified by the content ID was sent by the user identified by sender ID and received by the user identified by the receiver ID. By way of a non-limiting example, the content can be shared with a receiver by forwarding a URL identifying the content to the receiver. The URL can include one or more tracking parameters, including the sender's user ID, so that when the receiver clicks on the URL to view the content, a script, e.g., JavaScript™, call is made to cause the data to be collected, e.g., content ID, sender's user ID, etc.

Figure 3B:
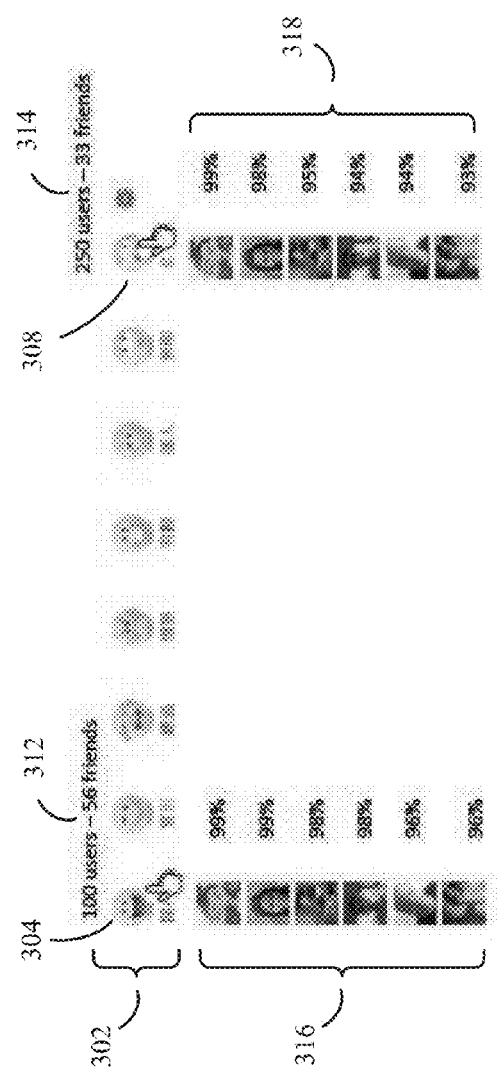
Figure 3C:
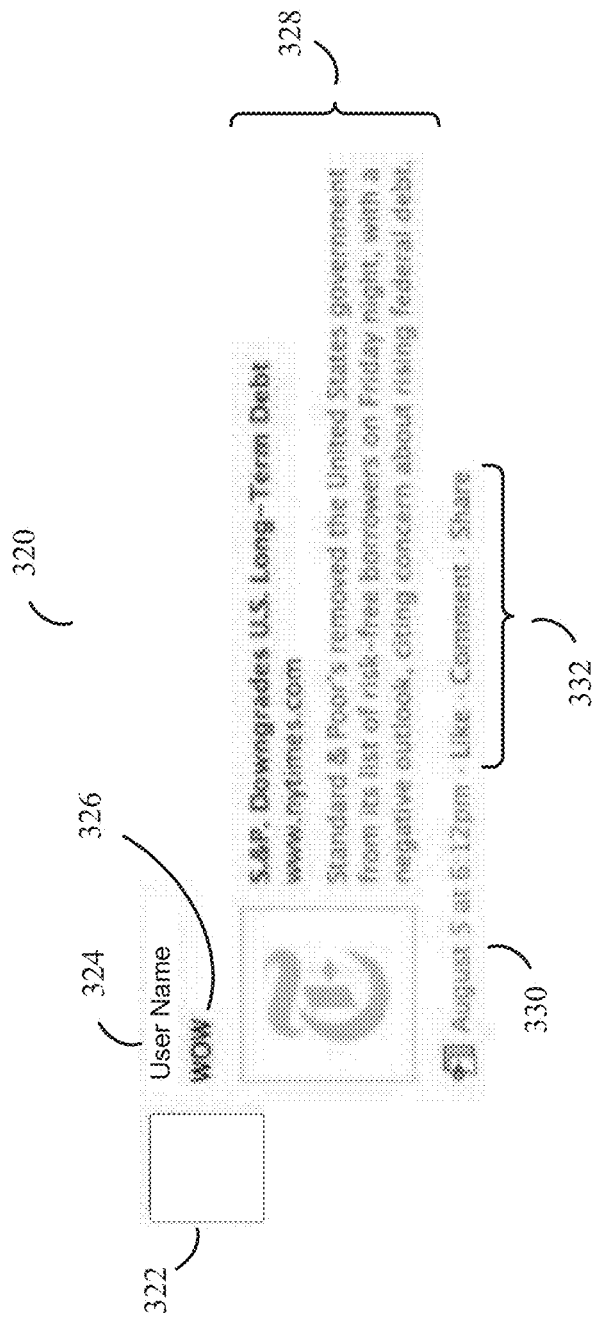

FIG. 3C provides an example of content received by a receiver in accordance with one or more embodiments of the present disclosure. In the example shown, the receiver receives the piece, or item, of content 328, along with the sentiment 326, e.g., WOW, selected by the sender and information identifying the sender, e.g., an avatar, or image, 322 and name 324. In the example, a timestamp 330, e.g., the sending timestamp, can be displayed in connection with the shared content. Additionally, as shown in the example, the receiver has various options to react to, or act on, the shared content. By way of some non-limiting examples, the receiver can indicate a "like", provide a comment in connection with the content and/or re-share the content. In the case that the receiver re-shares the content, the receiver can elect to use the same sentiment used by the sender or select a different sentiment.

In accordance with one or more embodiments, one or more users whose content is reacted to the most, e.g., clicked on or otherwise selected, can be identified as the top influencers, and are encouraged or incentivized to share. In accordance with one or more embodiments, influencers can be identified by sentiment and/or across sentiments.

Referring again to FIG. 1A, after some number of shares by a user, one or more models can be generated for the user at step 104 using some or all of the data collected in step 102. In accordance with one or more embodiments, the model can comprise a graph, which can be used to identify those users that will have a maximum propensity, relative to other users, to react to content shared by the sender using a particular sentiment, and a probability associated with each such receiver that the receiver is likely to react, e.g., click on or share, the content shared by the sender using the particular sentiment. The probability can be assigned to a given user per sentiment and/or assigned to a given sentiment taking into account all users for the given sentiment. In accordance with one or more embodiments, the probability comprises an influence relationship score, which is a measure of the sender's influence on a receiver, or potential receiver.

Where the sender has previously shared and a model has been generated for the sender, the sender selects the sentiment. In response, the sender is presented with a list of potential receivers, from which the sender can select to share the content. In accordance with one or more embodiments, the sender can specify preferences, which can be used in identifying the potential receivers. By way of some non-limiting examples, the sender can specify one or more parameters for generating the list of receivers, such as without limitation the receivers are to be the sender's friends, friends and strangers, and/or receivers having at least a certain probability of reacting to the shared content. In accordance with one or more embodiments, friends of the sender can be specified by the sender and/or can be identified from social networking data obtained for the user, e.g., address book data, calendar data, social networking systems, etc.

As an alternative to providing the user with the list of potential receivers, embodiments of the present invention can forward the content to the receivers on the list without the sender selecting receivers from the list. In such a case, the sender's preference can include an indication of whether or not the sender wishes to have the content automatically shared with the list of receivers without first reviewing the list.

Where the sender is to receive the list of receivers, the sender can select some or all of the receivers on the list. In accordance with one or more embodiments, the content is shared with each of the selected receivers using a sharing option determined for the sender. Alternatively, the sender can be presented with sharing option alternatives from which the sender can select to share the content. In such a case, the sender might select the same or a different sharing option for each receiver. Alternatively, the sharing option might be identified by the receiver, e.g., in the receiver's preferences. The sender has the opportunity to terminate the process without sharing the content with any receivers on the list. Additionally, sender preferences can be used to turn the sharing functionality on or off.

Figure 1B:
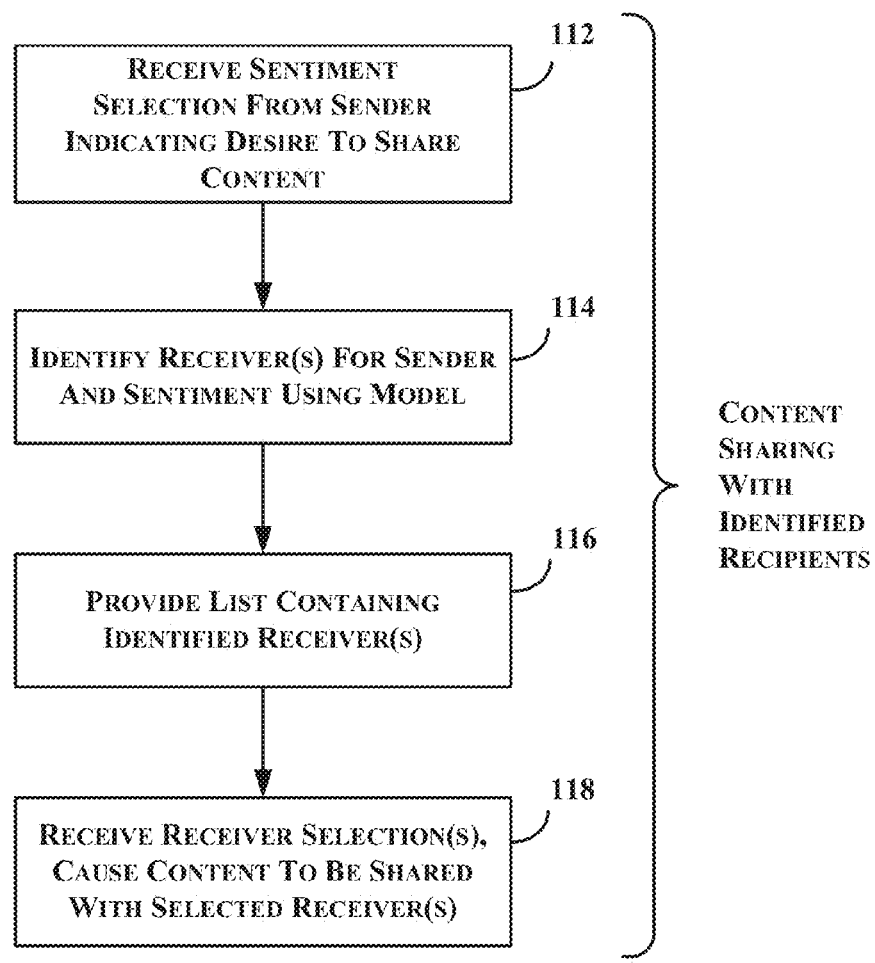

FIG. 1B provides an example of a sharing process flow with identified receivers in accordance with one or more embodiments of the present disclosure. At step 112, a sentiment selection is received from a sender in connection with an identified piece of content. At step 114, the list of receivers is identified for the sender using at least one trained model, e.g., graph, generated in step 104 of FIG. 11A and the sender's preferences. In accordance with one or more embodiments, the trained model corresponds to the sender and the sentiment selected by the sender. In the example shown in FIG. 1B, at step 116, the list of receivers is returned to the user, e.g., presented to the user via the web page displayed in the sender's browser application. At step 118, input is received that indicates the sender's selection(s) of receivers, e.g., from the list of receivers, and the content is caused to be forwarded to the selected receivers via one or more sharing options, e.g., a sharing option identified for the sender, a sharing option identified by the sender or identified by the receiver.

FIG. 3B provides an example of a user interface containing a list of receivers in accordance with one or more embodiments. The example provides two lists of receivers associated with two sentiment selections by the user. List 316, which can be displayed to the sender in response to the sender's selection of icon 304, corresponds to the sender's selection of the sentiment represented by icon 304 from sentiment indicators 302. In the example, information 312 apprises the sender of the total number of candidate users that are likely to respond to the sender's content with the corresponding sentiment and the number of the candidate users that are identified as friends. In the example, information 312 indicates that the total number of candidate users that are likely to respond is 100, and of those 100 candidate users, 56 are identified to be friends of the sender. In the example, each receiver is identified by an avatar, or picture icon, as well as a percentage probability that the receiver will act on the shared content. The list is sorted in order of the probability that the corresponding receiver with act on the shared content. It should be apparent that a receiver can be identified using something other than an image associated with the receiver, e.g., the receiver's name or nickname, etc., and that the list can be sorted using other criteria, e.g., receiver name or nickname. Similarly, list 318 and information 314 are provided to the sender where the sender selects the sentiment associated with icon 308.

Figure 4:
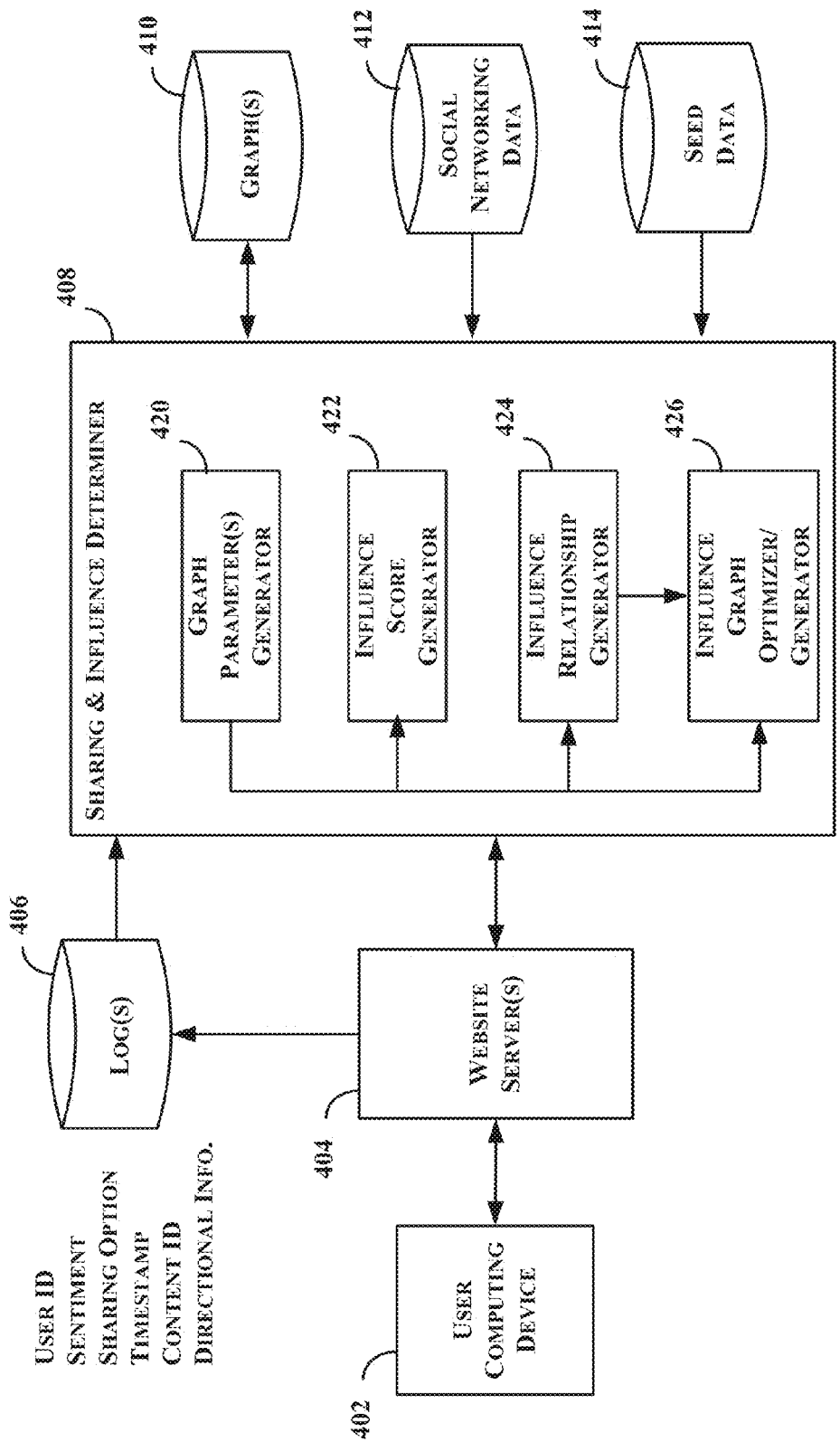

FIG. 4 provides a system overview illustrating components for use in accordance with one or more embodiments of the present disclosure. A web server 404 serves a web page to a user's computing device 402, which is typically displayed via a browser application executing on the device 402. In response to a sharing request is received from the device 402, data can be collected in log(s) 406. The data can be collected in connection with a request by a sender to share content and/or in connection with a receiver's reaction to the shared content, and can include without limitation, a user ID, which can be the sender's ID or the receiver's ID, the sentiment, sharing option, timestamp, which can be the sending or the receiving timestamp, content ID of the content being shared, and directional information, which indicates the direction of the sharing, e.g., identifies the user ID of the sender and the user ID of the receiver of the content.

In accordance with one or more embodiments, sharing and influence determiner 408 performs step 104 of FIG. 1A to generate the model(s)/graph(s) 410 using data extracted from log(s) 406 for a sender with data collected in the log(s) 406. In accordance with one or more such embodiments, for each sender, a graph 410 can be generated and/or optimized for each sentiment. The graph 410 that corresponds to the sender and the sentiment selected by the sender is used to identify the list of receivers. The list of receivers can be pre-determined and pushed to the web server 404 prior to a sender's request to share content, or the list of receivers can be determined in response to the sender's request, using the influence graph 410 associated with the sender and sentiment selected by the sender.

The sharing and influence determiner 408 can be provided by a computing device that is the same or separate from the website server 404 computing device. The determiner 408 can be provided by one or more computing devices. In accordance with one or more embodiments, the determiner 408 comprises a graph parameter generator 420, influence score generator 422, influence relationship generator 424 and an influence graph optimizer/generator 426, and has input including without limitation data from log(s) 406, graph(s) 410, social networking data 412 and seed data 414.

The graph parameter generator 420 generates parameters that are input to the influence score generator 422, influence relationship generator 424 and influence graph optimizer/generator 426. Graph parameter generator 420 generates values for graph parameters for a given user, i, and sentiment. Examples of graph parameters that can be generated by the graph parameter generator 420 include without limitation, C, # of C, CScore(i), RS(i), # of RS(i), RSScore(i), SSS, m(i), H(i), DS(i), TR(i,j), NF(i) and # of NF(i).

The following provides a discussion of graphs and graph terminology used herein. An irregular graph can be used to represent users for a given shared sentiment. The size of the graph can be represented as I, which can be the total number of users in the universe of users under a given identity system, such as without limitation Facebook™ login, Yahoo!™ login ID, etc. Each vertex in the graph corresponds to a user, i, and the degree of the vertex is the number of connections, or edges, connected to the vertex. An edge represents a relationship between two users, e.g., a social relationship and/or a relationship formed when a user reacts to another user's shared content. A path, A, represents a piece of content that is shared by a sending user with one or more receiving users, and a path, B, represents the piece of content that is shared by the sending user being re-shared by one or more receiving users. A cycle occurs where a piece of content shared by a sender is acted upon by a receiver. A cycle can be tracked, and the sender can be notified that the receiver acted on the shared piece of content.

A graph, G, which can be an irregular incomplete graph, represents the universe of users under a same identify system that share a common sentiment, S. Where a user, i, shares a piece of content with n users and j users of the n users act on the shared content, j cycles are created. Graph, G, can be noted as (I,g), where I is the set of vertices I={i, . . . , i} and an i×I matrix g=[$g_{op}$]$_{o,p \in I}$, where $g_{ij} \in \{0,1\}$ represents the availability of an edge between vertices o and p. The distance in the graph indicates the number of connections through which shared content traverses between two users.

The C(i) parameter comprises the set of users that click on content shared by user, i, and the # of C(i) parameter represents a count of the number of users included in the set C(o). A CScore(i) parameter reflects a score of the receivers that react to the shared content relative to others in the sender's network of users. The value of the CScore(i) parameter is determined relative to other users in user, i's, network, and can range from 0 to 1, with a value closer to 1 indicating that user, i, has relatively more users, e.g., friends and others, that react to content shared by user, i, than if the value is closer to 0. The value of CScore(i) is relative to other users in the user, i's' network, so a CScore (x) score that is greater than CScore(i) indicates that user, x, has more users reacting to content shared by user, x, than user, i, has users reacting to content shared by user, i.

The RS(i) parameter comprises the set of users that re-share content shared by user, i, using the same sentiment as user, i, and # of RS(i) represents a count of the number of users in the set RS(i). The RSScore(i) parameter reflects a score of the receivers that re-share the shared content using the same sentiment relative to others in the sender's network of users. The value of the RSScore(i) parameter is determined relative to other users in user, i's, network, and can range from 0 to 1, with a value closer to 1 indicating that user, i, has relatively more users, e.g., friends and others, that share content shared by user, i, using the same sentiment as user, i, than if the value is closer to 0. The value of RSScore(i) is relative to other users in the user, i's' network, so an RSScore(x) score that is greater than RSScore(i) indicates that user, x, has more users sharing the same content shared by user, x, using the same sentiment as user, x, than user, i, has users reacting to content shared by user, i, using the same sentiment. The SSS(i0 parameter is a function of the CScore(i) and RSScore(i) parameters, such that a higher value of SSS(i) indicates that the user, i's, content is responded to by a lot of users and they also share the content using the same sentiment relative to other user.

Where user, i, shares content with a set of users and some or all of the users in the set re-share the same content using the same sentiment to another set of users, M is an average network multiplier that represents a number on average of users in the second set of users who will re-share the content using the same sentiment. The users in user, i's, network that have the maximum multiplier effect for the same content can be identified by examining the re-share data. The parameter m(i) for user, i, represents the number of users to which the user re-shares using the same sentiment for a given period of time. The value of M for a given user can be the average of the values of m(i) across multiple periods of time.

The H(i) parameter identifies whether or not the user, i, creates a Hamiltonian Cycle. A user that is an originator of a Hamiltonian Cycle is one whose shared content reaches all others users in the graph. The user, i, whose shared content reaches all of the other users in the graph has a value of 1 for the H(i) parameter, and a value of 0 for H(i) otherwise.

In accordance with one or more embodiments, a dominating set is a set of users that are a part of a path through which if content is shared it reaches everyone in the graph. The parameter DS(i) for user, i, indicates whether or not the user, i, is a part of a sharing path that reaches everyone in graph, G, of users from a given social network, e.g., Facebook™ network of users, where the sharing can be sharing and re-sharing of a piece of content. By way of a non-limiting example, a value of 1 for DS(i) indicates that the user, i, is a part of the sharing path that reaches everyone in the graph, and a value of 0 indicates that the user, i, is not a part of the sharing path.

The TR(i) parameter is determined using a TR(i,j) parameter, which is determined using the sender, i's, timestamp and the receiver, j's, timestamp, and represents the time in which the receiver, j, responds to sender, i's, shared content. The TR(i) parameter represents the sum for all j of TR(i,j). The TR parameter can be normalized from 0 to 1, such that if TR(i) for sender, i, approaches 1 as the difference between the two timestamps approaches 0, and the value of TR(i) for sender, i, approaches 0 as the difference between the two timestamps is maximized.

The number of neighbors in a graph, e.g., graph G, for user, i, as indicated by the NF(i) parameter, represents the set of friends that user, i, has in user, i's, social graph, G, and # of NF(i) is the count of the number of friends in the set NF(i).

The influence score generator 422 generates an influence score, IF(i), for each user, i. A user's influence score can be determined using data associated with all of the pieces of content shared by user, i, to users in the user, i's, network. The value of IF(i) can be determined for each sentiment, and provides an indicator of the degree of the user, i's, influence over other users in the network. In accordance with one or more embodiments, a user's influence score is a function of one or more of the parameters generated by graph parameter generator 420, e.g., # of NF(i), # of C(i), # of RS(i), SSS(i), M(i), TR(i), h*H(i) and d*DS(i), where h is the number of Hamiltonian Cycles and d is the number of dominating sets, which are input to the influence score generator 422 to generate user, i's, influence score, IF(i). The influence score generator 422 can use seed data 414 to generate a SeedScore (i) for user, i., which is a function of data included in seed data 414. By way of a non-limiting example, SeedScore(i) can be a function of such seed data 414 as data identifying the tenure of the user, i, in a network, a spam score, a trust score, a value score. Such scores can be tracked in a network using reputation models, e.g., a network might have scores that indicate a level of spam, trust, value and longevity for a user. The SeedScore(i) can be used to seed initial values for a new user as part of the determination of a user's influence score, IF.

The influence relationship score generator 424 generates an influence relationship score, IR(i, j), for each sender, i, and receiver, j, pair. An influence relationship score, IR(i, j), indicates the extent of the user, i's, influence on user, j, in user, i's network for a given sentiment. A value of IR(i, j) can be determined for each sentiment. In accordance with one or more embodiments, the influence relationship score is a measure of the probability that the receiver will act, or acts, on the content shared by the sender.

In accordance with one or more embodiments, the influence relationship score is a function of parameters Content(i, j), TR(i, j) and SSS(i, j), RelationshipScore(i, j) and IF(j) generated for user, j, by influence score generator 422. The Content(i, j) parameter is a score that represents the number of content pieces acted on by user, j, that are sent by user, i. The SSS(i,j) parameter is determined using the number of content pieces sent by user, i, and acted on by user, j, and the number of content pieces re-shared by user, j, using the same sentiment as that used by user, i. The RelationshipScore(i,j) parameter is determined based on the number of times where sender, i, and/or receiver, j, has declared a relationship. By way of some non-limiting examples, a Twitter™ user might be a follower or have a following of users, a Facebook™ user can declare familial relationships, a dating site user can declare favorites, relationships can be identified via one or more applications, such as without limitation calendaring, address book, and messaging applications, etc.

Influence graph optimizer/generator 426 generates and/or optimizes graph G. In accordance with one or more embodiments, an optimized graph G is generated for a given sentiment, and identifies a set of suitable receivers as adjacent nodes, or neighbors, for the given user, i. Optimization criteria for identifying suitable receivers includes maximizing the set of C(i) for sender, i, with users having high IR(i,j) scores. Other examples of criteria that can be used in graph optimization include without limitation maximizing the number of cycles, C, maximizing the number of users with high multiplier score, m(i), maximizing the number of users in the set of SSS, optimizing the length of a path, e.g., path A or path B. Goals of optimization include without limitation optimizing the graph to maximize the number of cycles generated when a piece of content is shared, identifying groups of users so that where a user shares content for a particular sentiment, the user receives maximum reactions, e.g., click backs, notifying a user about the number of users that reacted relative to a given sentiment and time period, and/or encouraging users to share thereby increasing the average multiplier for the universe of users.

Figure 5:
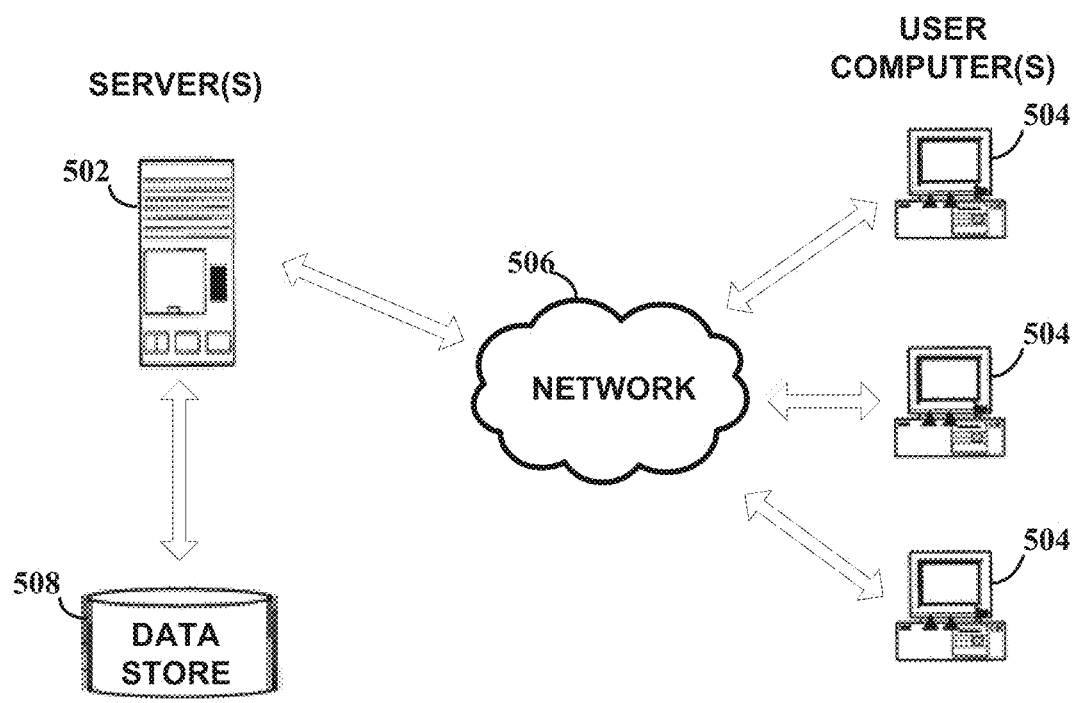
FIG. 5 illustrates some components that can be used in connection with one or more embodiments of the present disclosure.

FIG. 5 illustrates some components that can be used in connection with one or more embodiments of the present disclosure. In accordance with one or more embodiments of the present disclosure, one or more computing devices, e.g., one or more server computers such as website server(s) 404, user computing devices 402 or other computing device, are configured to comprise functionality described herein. For example, a computing device 502 can be configured to execute program code, instructions, etc. to provide functionality in accordance with one or more embodiments of the present disclosure.

Computing device 502 can serve content to user computing devices 504 using a browser application via a network 506. Data store 508, which can include log(s) 406, seed data 414, graphs 410 and/or social networking data 412, program code to configure a server 502 to execute, etc.

The user computing device 504 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 502 and the user computing device 504 can include one or more processors, memory, a removable media reader, network interface, display and interface, and one or more input devices, e.g., keyboard, keypad, mouse, etc. and input device interface, for example. One skilled in the art will recognize that server 502 and user computing device 504 may be configured in many different ways and implemented using many different combinations of hardware, software, or firmware.

In accordance with one or more embodiments, a computing device 502 can make a user interface available to a user computing device 504 via the network 506. The user interface made available to the user computing device 504 can include content items, or identifiers (e.g., URLs) selected for the user interface in accordance with one or more embodiments of the present invention. In accordance with one or more embodiments, computing device 502 makes a user interface available to a user computing device 504 by communicating a definition of the user interface to the user computing device 504 via the network 506. The user interface definition can be specified using any of a number of languages, including without limitation a markup language such as Hypertext Markup Language, scripts, applets and the like. The user interface definition can be processed by an application executing on the user computing device 504, such as a browser application, to output the user interface on a display coupled, e.g., a display directly or indirectly connected, to the user computing device 504.

In an embodiment the network 506 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 5. Alternatively, embodiments of the present disclosure can be implemented other environments, e.g., a peer-to-peer environment as one non-limiting example.

Figure 6:
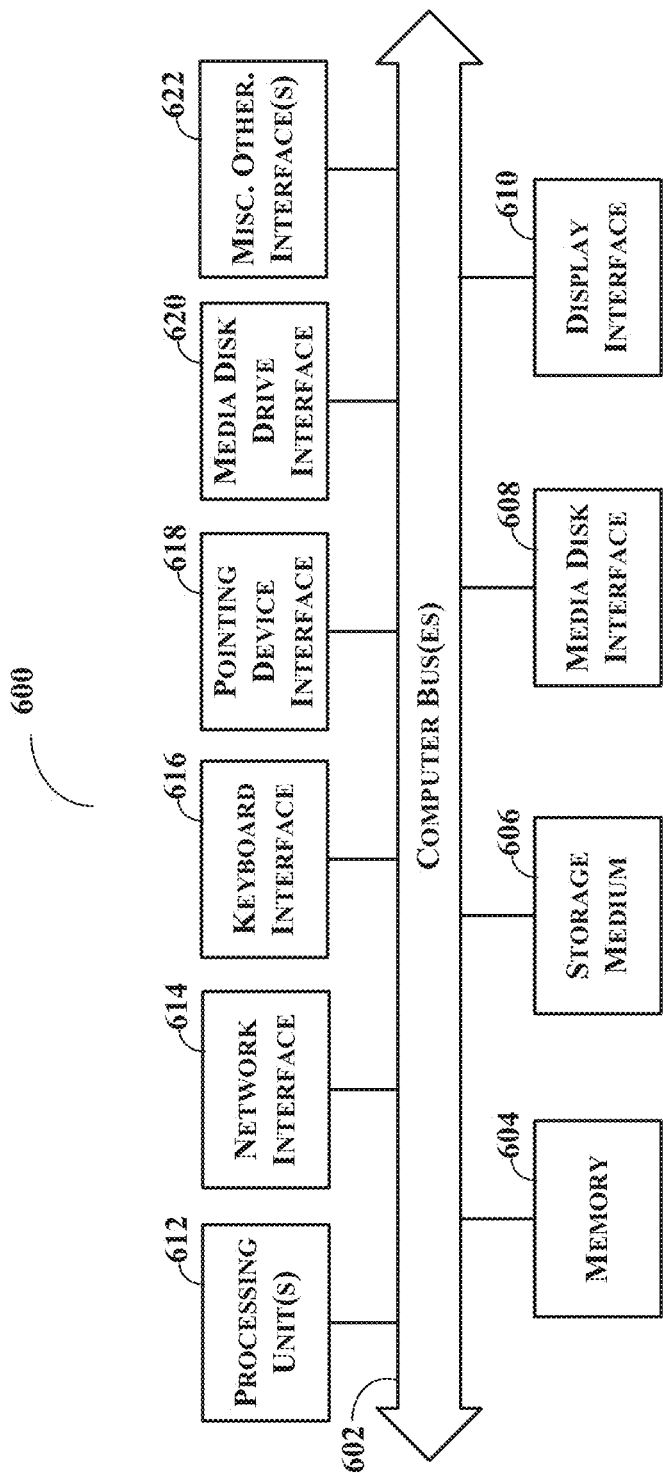
FIG. 6 is a detailed block diagram illustrating an internal architecture of a computing device in accordance with one or more embodiments of the present disclosure.

FIG. 6 is a detailed block diagram illustrating an internal architecture of a computing device, e.g., a computing device such as server 502 or user computing device 504, in accordance with one or more embodiments of the present disclosure. As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), etc., media disk drive interface 620 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, computer-readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
    serving, by a digital content sharing system server and for display at a user computing device, a user interface for facilitating digital content sharing, the user interface comprising digital content and a plurality of sentiment indicators selectable by a user of the user computing device to share the digital content, each sentiment indicator corresponding to a sentiment of a plurality of sentiments;
    receiving, by a digital content sharing system server, a request, via a user-selected sentiment indicator of the user interface for facilitating digital content sharing, the received request comprising a request to share the digital content with one or more other users of the digital content sharing system, the request to share the digital content identifying the digital content and a sentiment of the user about the digital content, the user's sentiment about the digital content identified by the request to share corresponds to a selected one of the plurality of sentiments;
    identifying, by the digital content sharing system server using the received request comprising the user's identified sentiment about the digital content, a list of potential receivers of the digital content for the user-selected sentiment, the identifying comprising the digital content sharing system server using a trained model, generated using training data comprising receiver reaction information for a number of previous digital content shares corresponding to the user and the sentiment selected by the user, to automatically determine an estimated content sharing probability associated with each potential receiver of the list and to select, using the automatically-determined estimated content sharing probability of each potential receiver, a number of potential receivers for inclusion in the list of potential receivers of the digital content for the user-selected sentiment;
    serving, by the digital content sharing system server and to the user computing device for display in response to the request to the share, the user interface for facilitating digital content sharing comprising the list of potential receivers, each potential receiver included in the list provided by the user interface being selectable by the user to share the digital content;
    receiving, by the digital content sharing system server via the user interface for facilitating digital content sharing, input indicating at least one receiver selected by the user from the identified list of potential receivers;

providing, by the digital content sharing system server and as a digital content share, the digital content to the at least one receiver selected by the requesting user from the served list of potential receivers automatically identified for the user by the digital content sharing system server using the trained model corresponding to the requesting user and the requesting user's identified sentiment received in the user's request to share the digital content;

receiving, by the digital content sharing system server, input indicative of interaction of the at least one receiver with the digital content; and automatically updating, by the digital content sharing system server, the trained model using training data comprising receiver reaction information for the digital content share in response to the received input indicative of interaction of the at least one receiver with the digital content.

2. The method of claim 1, the identifying a list of potential receivers further comprising:

accessing, via the at least one computing device and in response to the request to share the digital content, the trained model corresponding to the user and the sentiment selected by the user in automatically identifying a plurality of potential receivers, for each potential receiver of the plurality, the trained model identifying the estimated content sharing probability of the potential receiver acting on the digital content; and automatically selecting, via the at least one computing device, one or more potential receivers from the plurality for inclusion in the identified list of potential receivers using the estimated content sharing probability, identified by the trained model, of each potential receiver acting on the digital content.

3. The method of claim 2, the estimated content sharing probability of each potential receiver acting on the digital content, automatically determined by the digital content sharing system server using the trained model, comprises a measure of the user's influence on the potential receiver given the sentiment.

4. The method of claim 2, the potential receiver's acting on the digital content being determined by the digital content sharing system server using input comprising at least one of clicking on an electronic link to the digital content and re-sharing the digital content.

5. The method of claim 2, the selecting the one or more potential receivers for the list of potential receivers using the estimated content sharing probability, identified by the digital content sharing system server using the trained model, of each potential receiver acting on the digital content and preferences of the user.

6. The method of claim 2, the selecting further comprising:

automatically selecting, by the digital content sharing system server using the estimated content sharing probability of each potential receiver acting on the digital content as identified by the digital content sharing system server using the trained model, the one or more potential receivers having a greater estimated content sharing probability of acting on the digital content relative to the estimated content sharing probability of acting on the digital content of each other potential receiver from the plurality excluded from the identified list of potential receivers.

7. The method of claim 2, further comprising:

creating, by the digital content sharing system server, the trained model used to determine the estimated content sharing probability of each potential receiver acting on the digital content from data collected by tracking, using the digital content sharing system server, the digital content sharing of the user and tracking, using the digital content sharing system server, the receiver's acting on the digital content sharing, the data collected comprising user identification information for the user and the receiver, the sentiment selected by the user, content identification information, and a timestamp associated with the digital content sharing of the user and the receiver's acting on the digital content sharing.

8. A digital content sharing system server comprising:

a processor and a non-transitory computer-readable storage medium for tangibly storing thereon program logic for execution by the processor, the stored program logic comprising:

serving logic executed by the processor for serving, for display at a user computing device, a user interface for facilitating digital content sharing, the user interface comprising digital content and a plurality of sentiment indicators selectable by a user of the user computing device to share the digital content, each sentiment indicator corresponding to a sentiment of a plurality of sentiments;

receiving logic executed by the processor for receiving a request, via a user-selected sentiment indicator of the user interface for facilitating digital content sharing, the received request comprising a request to share the digital content with one or more other users of the digital content sharing system, the request to share the digital content identifying the digital content and a sentiment of the user about the digital content, the user's sentiment about the digital content identified by the request to share corresponds to a selected one of the plurality of sentiments;

identifying logic executed by the processor for identifying, using the user's identified sentiment about the digital content, a list of potential receivers of the digital content for the user-selected sentiment, the identifying comprising using a trained model, generated using training data comprising receiver reaction information of a number of previous digital content shares corresponding to the user and the sentiment selected by the user to automatically determine an estimated content sharing probability associated with each potential receiver of the list and to select, using the automatically-determined estimated content sharing probability of each potential receiver, a number of potential receivers for inclusion in the list of potential receivers of the digital content for the user-selected sentiment;

serving logic executed by the processor for serving, to the user computing device in response to the request to share, the user interface for facilitating digital content sharing comprising the list of potential receivers, each potential receiver included in the list provided by the user interface being selectable by the user to share the digital content;

receiving logic executed by the processor for receiving, via the user interface for facilitating digital content sharing, input indicating at least one receiver selected by the user from the identified list of potential receivers;

providing logic executed by the processor for providing the digital content, as a digital content share, to the at least one receiver selected by the requesting user from the served list of potential receivers automatically identified for the user using the trained model corresponding to the requesting user and the requesting user's identified sentiment received in the user's request to share the digital content;

receiving logic executed by the processor for receiving input indicative of interaction of the at least one receiver with the digital content; and updating logic executed by the processor for automatically updating the trained model using training data comprising receiver reaction information for the digital content share in response to the received input indicative of interaction of the at least one receiver with the digital content.

9. The digital content sharing system server of claim 8, the identifying logic executed by the processor for identifying a list of potential receivers further comprising:

accessing logic executed by the processor for accessing, in response to the request to share the digital content, the trained model corresponding to the user and the sentiment selected by the user in automatically identifying a plurality of potential receivers, for each potential receiver of the plurality, the trained model identifying the estimated content sharing probability of the potential receiver acting on the digital content; and selecting logic executed by the processor for automatically selecting one or more potential receivers from the plurality for inclusion in the identified list of potential receivers using the estimated content sharing probability, identified by the trained model, of each potential receiver acting on the digital content.

10. The digital content sharing system server of claim 9, the estimated content sharing probability of each potential receiver acting on the digital content, automatically determined using the trained model, comprises a measure of the user's influence on the potential receiver given the sentiment.

11. The digital content sharing system server of claim 9, the potential receiver's acting on the digital content being determined using input comprising at least one of clicking on an electronic link to the digital content and re-sharing the digital content.

12. The digital content sharing system server of claim 9, the one or more potential receivers being selected from the plurality using the estimated content sharing probability, identified using the trained model, of each potential receiver acting on the digital content shared by the user and preferences of the user.

13. The digital content sharing system server of claim 9, the selecting logic executed by the processor for selecting further comprising instructions to:

selecting logic executed by the processor for automatically selecting, using the estimated content sharing probability of each potential receiver acting on the digital content as identified using the trained model, the one or more potential receivers having a greater estimated content sharing probability of acting on the digital content relative to the respective probability of acting on the digital content of each other potential receiver from the plurality excluded from the identified list of potential receivers.

14. The digital content sharing system server of claim 9, the stored program logic further comprising:

creating logic executed by the processor for creating the trained model used to determine the estimated content sharing probability of each potential receiver acting on the digital content from data collected by tracking the digital content sharing of the user and tracking the receiver's acting on the user's digital content sharing, the data collected comprising user identification information for the user and the receiver, the sentiment selected by the user, content identification information, and a timestamp associated with the digital content sharing of the user and the receiver's acting on the digital content sharing.

15. A computer readable non-transitory storage medium for tangibly storing thereon computer readable instructions that when executed by a digital content sharing system server, perform a method comprising:

serving, for display at a user computing device, a user interface for facilitating digital content sharing, the user interface comprising digital content and a plurality of sentiment indicators selectable by a user of the user computing device to share the digital content, each sentiment indicator corresponding to a sentiment of a plurality of sentiments;

receiving a request, via a user-selected sentiment indicator of the user interface for facilitating digital content sharing, the received request comprising a request to share the digital content with one or more other users, the request to share the digital content identifying the digital content and a sentiment of the user about the digital content, the user's sentiment about the digital content identified by the request to share corresponds to a selected one of the plurality of sentiments;

identifying, using the received request comprising the user's identified sentiment about the digital content, a list of potential receivers of the digital content for the user-selected sentiment, the identifying comprising using a trained mode, generated using training data comprising receiver reaction information for a number of previous digital content shares corresponding to the user and the sentiment selected by the user to automatically determine an estimated content sharing probability associated with each potential receiver of the list and to select, using the automatically-determined estimated content sharing probability of each potential receiver, a number of potential receivers for inclusion in the list of potential receivers of the digital content for the user-selected sentiment;

serving, to the user computing device for display in response to the request to share, the user interface for facilitating digital content sharing comprising the list of potential receivers, each potential receiver included in the list provided by the user interface being selectable by the user to share the digital content;

receiving, via the user interface for facilitating digital content sharing, input indicating at least one receiver selected by the user from the identified list of potential receivers;

providing the digital content, as a digital content share, to the at least one receiver selected by the requesting user from the served list of potential receivers automatically identified for the user using the trained model corresponding to the requesting user and the requesting user's identified sentiment received in the request to share the digital content;

receiving input indicative of interaction of the at least one receiver with the digital content; and automatically updating the trained model using training data comprising receiver reaction information for the digital content share in response to the received input indicative of interaction of the at least one receiver with the digital content.

16. The computer readable non-transitory storage medium of claim 15, the instructions to identify a list of potential receivers further comprising instructions to:
   access, in response to the request to share the digital content, the trained model corresponding to the user and the sentiment selected by the user in automatically identifying a plurality of potential receivers, for each potential receiver of the plurality, the trained model identifying the estimated content sharing probability of the potential receiver acting on the digital content; and
   automatically select one or more potential receivers from the plurality for inclusion in the identified list of potential receivers using the estimated content sharing probability, identified by the trained model, of each potential receiver acting on the digital content.

17. The computer readable non-transitory storage medium of claim 16, the estimated content sharing probability of each potential receiver acting on the digital content comprises a measure of the user's influence on the potential receiver given the sentiment.

18. The computer readable non-transitory storage medium of claim 16, the potential receiver's acting on the digital content comprising at least one of clicking on an electronic link to the digital content and re-sharing the digital content.

19. The computer readable non-transitory storage medium of claim 16, the one or more potential receivers being selected from the plurality using the estimated content sharing probability, identified by the digital content sharing system server using the trained model, of each potential receiver acting on the digital content and preferences of the user.

20. The computer readable non-transitory storage medium of claim 16, the instructions to select further comprising instructions to:
   automatically select, the estimated content sharing probability of each potential receiver acting on the digital content as identified using the trained model, the one or more potential receivers having a greater estimated content sharing probability of acting on the digital content relative to the estimated content sharing probability of acting on the digital content of each other potential receiver from the plurality excluded from the identified list of potential receivers.

21. The computer readable non-transitory storage medium of claim 16, the instructions further comprising instructions to:
   create the trained model used to determine the estimated content sharing probability of each potential receiver acting on the digital content from data collected by tracking the digital content sharing of the user and tracking the receiver's acting on the digital content sharing, the data collected comprising user identification information for the user and the receiver, the sentiment selected by the user, content identification information, and a timestamp associated with the digital content sharing of the user and the receiver's acting on the digital content sharing.

* * * * *